United States Patent
Lauber et al.

(10) Patent No.: US 10,994,649 B2
(45) Date of Patent: May 4, 2021

(54) ADJUSTING SCREW

(71) Applicant: EJOT GmbH & Co. KG, Bad Berleburg (DE)

(72) Inventors: Marcus Lauber, Bad Berleburg (DE); Ralf Peter, Bad Berleburg (DE); Andreas Hentschel, Velbert (DE)

(73) Assignee: EJOT GmbH & Co. KG, Bad Berleburg (DE)

( * ) Notice: Subject to any disclaimer, the term of this patent is extended or adjusted under 35 U.S.C. 154(b) by 5 days.

(21) Appl. No.: 16/347,086

(22) PCT Filed: Oct. 19, 2017

(86) PCT No.: PCT/EP2017/076699
§ 371 (c)(1),
(2) Date: May 2, 2019

(87) PCT Pub. No.: WO2018/086839
PCT Pub. Date: May 17, 2018

(65) Prior Publication Data
US 2019/0270401 A1    Sep. 5, 2019

(30) Foreign Application Priority Data

Nov. 11, 2016   (DE) ..................... 10 2016 222 195.7

(51) Int. Cl.
*B60Q 1/068*    (2006.01)
*F16H 25/20*    (2006.01)
(Continued)

(52) U.S. Cl.
CPC .......... *B60Q 1/0683* (2013.01); *F16B 35/005* (2013.01); *F16H 25/2015* (2013.01); *F16H 25/24* (2013.01)

(58) Field of Classification Search
CPC ..... B60Q 1/0683; F16B 35/005; F16H 25/24; F16H 25/2015
See application file for complete search history.

(56) References Cited

U.S. PATENT DOCUMENTS 2,094,089 A * 9/1937 Baker ..................... F21S 41/29
                                              362/507
3,430,996 A    3/1969 Ulatowski
(Continued)

FOREIGN PATENT DOCUMENTS

CN    1111578 A    11/1995
CN    103836571 A    6/2014
(Continued)

OTHER PUBLICATIONS

German Search Report dated Nov. 11, 2016.
(Continued)

*Primary Examiner* — Julie A Bannan
(74) *Attorney, Agent, or Firm* — Wood, Phillips, Katz, Clark & Mortimer

(57) ABSTRACT

An adjusting screw (1) for adjusting a position of a headlight, comprising: a screw element (2) having a larger diameter at one end (2a) and a smaller diameter at another end (2b), and a counter element (3) with an area having a larger diameter (3a), wherein the screw element (2) and the counter element (3) are designed such that the end (2b) of the screw element (2) with the smaller diameter can be connected to the counter element (3), and wherein the screw element (2) comprises in a area with a smaller diameter a profile (4) and a corresponding method.

9 Claims, 2 Drawing Sheets

(51) Int. Cl.
*F16H 25/24* (2006.01)
*F16B 35/00* (2006.01)

(56) References Cited

U.S. PATENT DOCUMENTS

| | | | |
|---|---|---|---|
| 3,508,593 A | | 4/1970 | Gill |
| 5,045,988 A | | 9/1991 | Hebert |
| 5,351,170 A | * | 9/1994 | Nagengast ........... B60Q 1/0683 362/273 |
| 5,444,603 A | * | 8/1995 | Otsuka ................ B60Q 1/0683 362/273 |
| 5,499,173 A | * | 3/1996 | Yamamoto .............. F21S 45/33 362/460 |
| 6,017,136 A | * | 1/2000 | Burton ................ B60Q 1/0683 362/273 |
| 6,315,439 B1 | | 11/2001 | Denley |
| 6,793,359 B2 | * | 9/2004 | Iwamoto .............. B60Q 1/0683 362/39 |
| 2002/0044440 A1 | * | 4/2002 | Chiang ................ B60Q 1/0683 362/37 |
| 2004/0120159 A1 | * | 6/2004 | Nishizawa ............. B60Q 1/076 362/512 |
| 2006/0092653 A1 | | 5/2006 | Tachiiwa et al. |
| 2012/0134740 A1 | | 5/2012 | Halder |
| 2016/0076757 A1 | * | 3/2016 | Seki ...................... F21S 41/657 362/524 |
| 2016/0167564 A1 | | 6/2016 | Letoumelin et al. |

FOREIGN PATENT DOCUMENTS

| | | |
|---|---|---|
| CN | 103867986 A | 6/2014 |
| DE | 19537815 A1 | 4/1997 |
| DE | 10 2012 005 104 A1 | 9/2013 |
| DE | 20 2005 008 060 U1 | 8/2015 |
| FR | 2 719 651 B1 | 11/1995 |

OTHER PUBLICATIONS

International Search Report and Written Opinion dated May 17, 2018.
Chinese Office Action dated Jun. 2, 2020 (including a Partial Translation thereof).
International Preliminary Report on Patentability dated May 23, 2019.
Chinese Office Action dated Jan. 18, 2021 (partial translation).
Chinese Office Action dated Jan. 18, 2021 (translation of Search Report).

\* cited by examiner

ADJUSTING SCREW

The present invention concerns an adjusting screw for adjusting a position of a headlight, a corresponding headlight and a method for arranging the adjusting screw.

To ensure that the light cone of a motor vehicle headlight illuminates the road at the correct angle, the headlights comprise an adjusting mechanism. With this adjusting mechanism, the light cone of the headlight can be adjusted either manually or automatically relative to the vehicle.

An essential part of the adjusting mechanism is the so-called adjusting screw. The adjusting screw is designed in such a way that it can be turned by a drive mechanism. In addition, the adjusting screw comprises a profile, preferably in the form of a thread. By turning the adjusting screw, an adjusting device arranged at the adjusting screw can be moved axially along the adjusting screw by means of the profile. This adjusting device is connected to the headlight in such a way that the alignment of the light cone of the headlight changes depending on the movement of the adjusting device.

The adjusting mechanism should be economical to manufacture, easy to assemble and reliable to operate. In addition, the adjusting mechanism should be universally applicable, i.e. in a large number of different motor vehicles for different types of headlights.

The object of the invention is to provide an adjusting screw, a headlight and a corresponding method with Which such an adjusting mechanism can be realised.

This object is solved by the subject-matter of the independent claims. Preferred embodiments are given by the dependent claims.

The invention includes an adjusting screw for adjusting a position of a headlight. The adjusting screw comprises two elements, a screw element and a counter element. The screw element comprises a larger diameter at one end and a smaller diameter at the other end. The counter element comprises at least one area with a larger diameter. The screw element and the counter element are designed to be joined together. In particular, the end of the screw element with the smaller diameter is designed to be connected to the counter element. The screw element also comprises a profile in a smaller diameter area. This profile is preferably arranged at the outside, i.e. the circumferential surface of the screw element. This profile is preferably designed in such a way that rotation of the adjusting screw results in axial movement of an adjusting device arranged at the adjusting screw.

Such an adjusting screw can easily be assembled in a housing of a headlight. It also allows both ends of the adjusting screw to be accessed from outside the housing and therefore, the adjusting screw could be rotated from both ends.

The screw element and the counter element are also referred to as the elements in the following. According to the invention, the elements have ends and areas with smaller or larger diameters. Basically, these ends and areas differ in that a larger diameter of an element is larger than the smaller diameter of the same element and in that the smaller diameter of an element is smaller than the larger diameter of the same element. In particular, the diameters are designed in such a way that the adjusting screw can be assembled as intended. During assembly, the ends and areas of the adjusting screw are inserted through openings into the housing. The ends and areas with a larger diameter are designed in such a way that they cannot be inserted into the housing through the corresponding opening and are therefore arranged outside the housing. The ends and areas with a smaller diameter are designed in such a way that they can be inserted into the housing through the corresponding openings and are thus arranged inside the housing. In this invention, one end of an element is an end portion of the element. Thus, the location or area with a smaller or larger diameter does not necessarily have to be arranged at the end point of the element, but can also be spaced from the end point.

The diameters of the ends or areas of the screw element and the counter element and the diameters of the openings can be different, partly different or the same. For example, the diameters of the openings in the housing may be substantially the same. Similarly, the areas and ends with larger diameters of the elements may have substantially the same diameter and the areas and ends with smaller diameters of the elements may also have substantially the same diameters. However, the diameters can also be different. For example, if the opening at the counter element is much smaller than the opening at the screw element, the larger diameter of the counter element may be smaller than the diameter of the screw element in the area with the profile.

This invention describes the thickness of the elements and the size of the openings with diameters, because the elements generally have a circular cross-section. However, this is not necessarily the case. Thus, the screw element and the counter element may at least comprise areas that do not have a circular cross section. For example, the ends with a larger diameter may comprise a square, hexagonal or differently shaped cross-section.

The screw element and the counter element are designed in such a way that they can be connected to each other. This is preferably a joint whose integrity is not affected by the rotation of one or both elements. In order to make it as easy as possible to connect the two elements in the housing, i.e. to assemble the adjusting screw, this is preferably a clamp connection or snap-in connection. For this purpose, one of the two elements can comprise a projection which can be inserted into a recess in the other element.

According to the invention, the adjusting screw in the assembled state comprises at least two areas or ends with a larger diameter outside the housing and at least one area with a smaller diameter and a profile inside the housing. To achieve this, the end of the screw element with the smaller diameter may be designed so that it can be inserted through one opening in the housing during assembly and be guided at least partially out of the housing through the other opening. Here, it can be connected to the counter element. The screw element and the counter element can also each comprise one end with a smaller diameter and these two ends can be inserted into the housing through the corresponding opening during assembly. Here, the screw element and the counter element can be connected with each other. In principle, however, the connection can also be made in such a way that one end of the counter element is inserted into the housing and one end of the screw element is led out of the housing. The screw element and the counter element can thus be connected to each other inside the housing and/or outside the housing. In one embodiment, the screw element and the counter element are detachably connected to each other.

In a preferred embodiment of the present invention, the two elements are connected to each other in a rotationally fixed manner, i.e. if one of the elements is rotated, the other element also rotates. This means that the profile at the screw element can be rotated both by a movement of the screw element and by a movement of the counter element.

Preferably, at least one of the elements has a drive geometry. As explained above, one end or area of the elements should be arranged outside the housing after assembly. This is an end or area with a larger diameter. The drive geometry is preferably arranged at such an end or area. Therefore, the adjusting screw can be rotated from outside the housing, causing the headlight to move. According to a further preferred embodiment, both elements have at least one drive geometry, whereby the drive geometry is preferably arranged in the above-mentioned areas or at these ends. Examples of such drive geometries are a bevel gear or a hexagon socket. The more drive geometries are arranged at the ends, the more different adjusting mechanisms can be used with the adjustment screw according to the invention.

In another preferred embodiment of the present invention, the adjusting screw is designed in such a way that it seals at least one of the openings in the housing. By assembling the adjusting screw, at least one of the openings in the housing is closed in such a way that no moisture penetrates into the housing when used as intended. For this purpose, at least one of the elements has a sealing means in the area which, when assembled, is arranged in the opening. This area preferably has a smaller diameter so that it can be placed in the opening. However, the smaller diameter in this area may be larger than the diameter at the end of the element or than the diameter in the area with the profile. For example, the sealing means may be a circumferential rubber seal. The sealing means is preferably arranged at least partially in a circumferential groove in the element. In the context of this invention, a sealing means can be used that seals the screw element and/or the counter element radially and/or axially with the housing.

In a preferred embodiment of the present invention, the adjusting screw also comprises at least one stop. The stop is a projection at the adjusting screw Which limits the axial movement of an adjusting device on the adjusting screw. In another preferred embodiment, the adjusting screw comprises two stops to limit the movement of the adjusting device in both directions.

In a preferred embodiment, the adjusting screw also comprises at least one spring element. The spring element provides an axial tolerance compensation between one end or area of larger diameter and the housing. The spring element can be designed as a separate component. However, the function of the spring element can also be provided by the sealing means, for example.

The invention also includes a headlight with a housing and an adjusting screw. The housing has two openings through which the adjusting screw extends. The adjusting screw comprises a screw element and a counter element and in the assembled state the larger diameters of the screw element and the counter element are each outside the housing. The area of the screw element with the profile is inside the housing.

The invention also includes a method for arranging an adjusting screw in a housing of a headlight to adjust a position of the headlight. The method includes, among others, the step of arranging a screw element of the adjusting screw in an opening of the headlight housing. The screw element is arranged in such a way that one end of the screw element with a larger diameter is outside the housing and that an area of the screw element with a profile is inside the housing. The method also includes the step of arranging a counter element at another opening of the headlight housing. The method also includes the step of connecting the screw element to the counter element.

The invention is explained in more detail below by the embodiment example as shown in the attached drawings. From the embodiment example follow further details, features and advantages of the subject matter of the invention.

Figure 1:
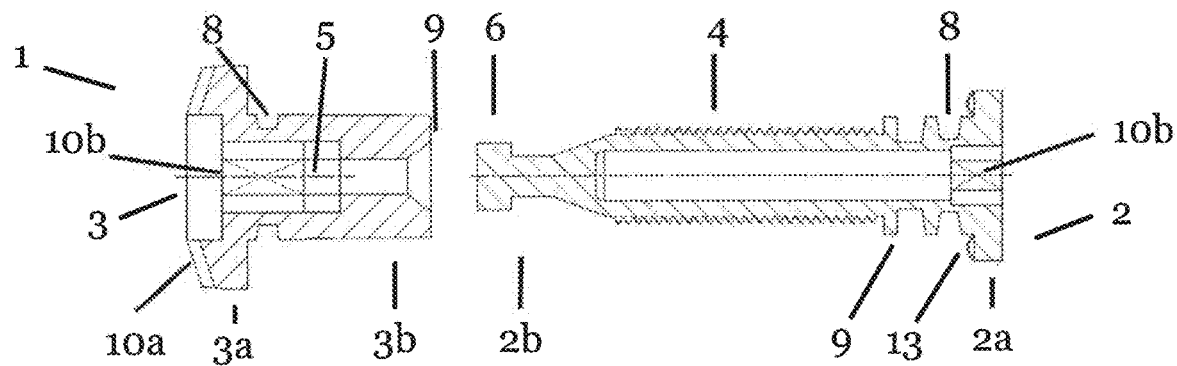
FIG. 1 shows a vertical section through a design of the adjusting screw, at a point in time when the screw element and the counter element have not yet been connected.

FIG. 1 shows a vertical section through the adjusting screw 1 according to the invention. Adjusting screw 1 comprises two elements, screw element 2 and counter element 3. The person skilled in the art is aware that adjusting screw 1 may also comprise further elements. In particular, the features designed here on elements 2, 3 do not necessarily have to be arranged in one piece on elements 2, 3, but can also be realized using further elements.

Screw element 2 comprises two ends. In this embodiment, there is one end 2a with a larger diameter and one end 2b with a smaller diameter. The larger diameter end 2a has a diameter larger than the opening of a headlight housing in Which the screw element 2 is to be assembled, so that this end 2a remains outside the housing when assembled. In particular, this end 2a of screw element 2 remains outside the housing so that it can be rotated from outside the housing. The person skilled in the art is aware that this can be achieved in different ways. In particular, this end 2a and the opening in the housing can be designed in such a way that the end 2a is recessed in the housing wall and, if necessary, flushes with the outside of the housing wall.

The end 2b with the smaller diameter comprises a diameter smaller than the opening of the housing of the headlight in which the screw element 2 is to be assembled. Thus, this end 2b of the screw element 2 can be arranged in the housing during assembly. The screw element 2 also comprises an area with a smaller diameter at which a profile 4 is arranged. Due to the smaller diameter of this area, profile 4 can also be arranged inside the housing.

In the embodiment shown in FIG. 1, the counter element 3 comprises an area with a larger diameter which is arranged at one end 3a of the counter element 3. As explained in connection with screw element 2, this end 3a of counter element 3 is also designed to be arranged outside the housing when assembled. In addition, the counter element 3 in this embodiment comprises a further end 3b with a smaller diameter, which is designed to be arranged in the housing.

In the invention, the screw element 2 and the counter element 3 are designed to be connected to each other. In the embodiment shown in FIG. 1, the counter element 3 comprises a recess 5 for this purpose and the end 2b of the screw element 2 comprises a corresponding projection 6. The recess 5 and the projection 6 are designed in such a way that the two elements 2 and 3 can be connected to each other by sliding them together. In order that this connection cannot be easily loosened during the use of the adjusting screw 1, the projection 6 in the embodiment shown in FIG. 1 extends transversely to the longitudinal extension of the screw element 2 and the recess 5 comprises a corresponding undercut. However, the person skilled in the art is aware that there are many different ways of simply connecting screw element 2 and counter element 3.

Figure 2:
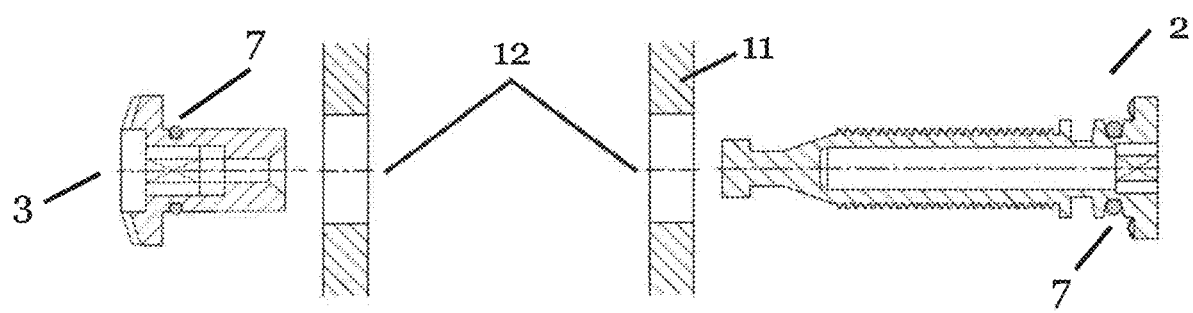
FIG. 2 shows the embodiment of the adjusting screw from FIG. 1 before assembling in the openings of a housing.

In FIG. 1, the screw element 2 and the counter element 3 also comprise means which help to seal the openings in the housing when the adjusting screw 1 is assembled. In this example, the screw element 2 and the counter element 3 each comprise grooves 8, which are arranged in such a way that they are essentially in the openings when assembled. For example, circumferential rubber seals 7 can be arranged in the grooves 8, as shown in FIG. 2. These circumferential rubber seals 7 are adapted to the geometry of the grooves in the present embodiment.

FIG. 1 also shows examples of stops 9 which can be used to limit the movement of an adjusting device on the adjusting screw 1.

FIG. 1 also shows examples of how drive geometries can be arranged on screw element 2 and counter element 3. In this embodiment, the counter element 3 comprises a bevel gearing 10*a* in the area with a larger diameter 3*a*. In addition, in this embodiment the screw element 2 and the counter element 3 each comprise a recess 10*b* for an internal hexagon.

Figure 3:
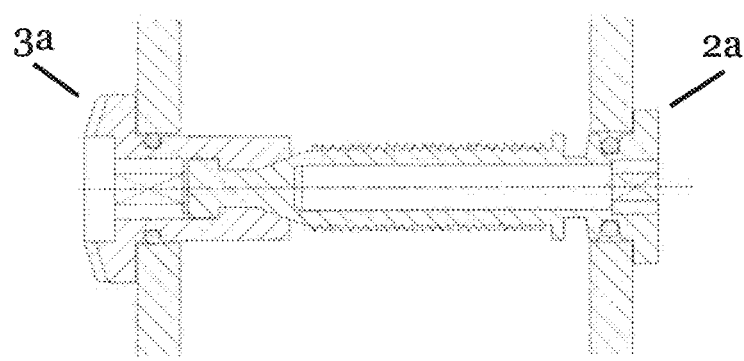
FIG. 3 shows the embodiment of the adjusting screw shown in FIG. 1 when assembled.

FIGS. 2 and 3 illustrate the assembly of the adjusting screw 1 shown in FIG. 1. Therefore, the reference signs introduced in FIG. 1 are not repeated in these figures. The screw element 2 and the counter element 3 are each partially guided through an associated opening 12 of the housing 11 into the housing 11 and then connected together in the housing 11. In the assembled state, the areas and ends with a larger diameter 2*a*, 3*a* are arranged outside the housing 11 and, in particular, the area with the profile 4 is arranged inside the housing 11. In addition, in the assembled state, the circumferential rubber seals 7 are arranged in the area of the openings 12.

The adjusting screw can comprise one or more spring elements 13 for tolerance compensation within the housing. FIG. 1 shows an example of a spring element 13 arranged at the end with a larger diameter 2*a* of the screw element 2. In addition, for example, a spring element 13 can also be arranged at the counter element 3.

Figure 4A:
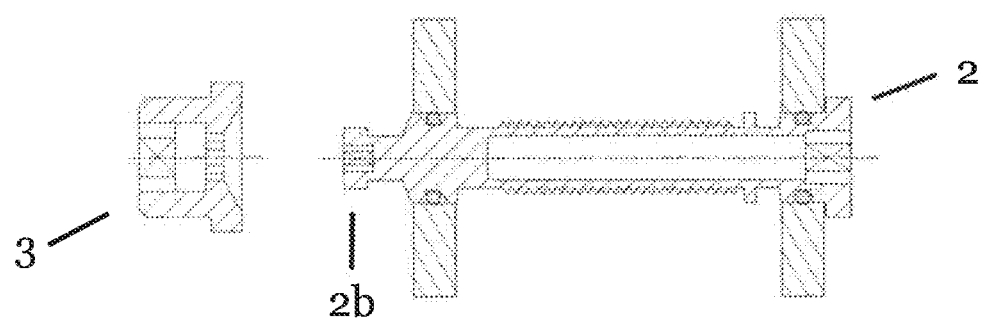
FIGS. 4a and 4b show an alternative embodiment of the adjusting screw.
Figure 4B:
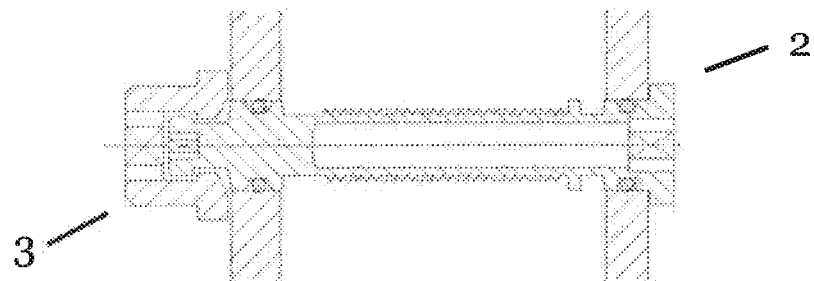

FIGS. 4*a* and 4*b* illustrate an embodiment in which the counter element 3 comprises no end with a smaller diameter and the screw element 2 is designed in such a way that the end 2*b* with the smaller diameter can be inserted through an opening in the housing and protrude through the other opening. The screw element 2 and the counter element 3 are then assembled such that the end 2*b* of the screw element with the smaller diameter is inserted through the housing 11 so that it protrudes from the housing at the other opening. There, the end 2*b* is connected to the counter element.

The person skilled in the art will understand that the embodiment examples shown are only examples and that all shown elements, means and features can be designed differently, but can still fulfil the basic functionalities described here.

The invention claimed is:

1. A headlight (11) comprising a housing and an adjusting screw (1) for adjusting a position of a headlight, wherein the adjusting screw comprises:
a screw element (2) having a larger diameter at one end (2*a*) and a smaller diameter at another end (2*b*), and
a counter element (3) with an area having a larger diameter (3*a*),
wherein the end of the screw element (2) with the smaller diameter is connectable to the counter element (3), and
wherein the screw element (2) has a profile (4) in an area with the smaller diameter,
wherein at least one of the screw element (2) and the counter element (3) comprise a drive geometry wherein the drive geometry is a bevel gear (10*a*), and
wherein the housing (11) comprises two openings (12) through which the interconnected screw element (2) and counter element (3) extend such that the larger diameters (2*a*, 3*a*) are each outside the housing (11) and the area of the screw element (2) with a profile (4) is inside the housing (11).

2. The adjusting screw (1) according to claim 1, wherein one of the screw element (2) and the counter element (3) comprises a recess (5) and the other comprises a projection (6), and wherein the recess (5) and the projection (6) are designed in such a way that by means of the recess (5) and the projection (6) the screw element (2) and the counter element (3) can be connected.

3. The adjusting screw (1) according to claim 1, wherein the screw element (2) and the counter element (3) are designed to be non-rotatably connected to each other.

4. The adjusting screw (1) according to claim 1, wherein at least one of the screw element (2) and the counter element (3) comprise a sealing means.

5. The adjusting screw (1) according to claim 4, wherein the sealing means is a circumferential rubber seal (7).

6. The adjusting screw (1) according to claim 5, wherein the circumferential rubber seal (7) is arranged in a circumferential groove (8).

7. The adjusting screw (1) according to claim 1, wherein the profile (4) is forming a thread.

8. The adjusting screw (1) according to claim 1, wherein at least one of the screw element (2) and the counter element (3) comprises a stop (9) which limits the travel of an adjusting device arranged at the profile (4) of the screw element (2).

9. The adjusting screw (1) according to claim 1, wherein the adjusting screw comprises at least one spring element (13).

\* \* \* \* \*